US006904146B2

(12) United States Patent
Domer et al.

(10) Patent No.: US 6,904,146 B2
(45) Date of Patent: Jun. 7, 2005

(54) FULL DUPLEX ECHO CANCELLING CIRCUIT

(75) Inventors: Steven M. Domer, Mesa, AZ (US); Samuel L. Thomasson, Gilbert, AZ (US)

(73) Assignee: Acoustic Technology, Inc., Mesa, AZ (US)

( * ) Notice: Subject to any disclaimer, the term of this patent is extended or adjusted under 35 U.S.C. 154(b) by 371 days.

(21) Appl. No.: 10/138,615

(22) Filed: May 3, 2002

(65) Prior Publication Data

US 2003/0206624 A1 Nov. 6, 2003

(51) Int. Cl.[7] .............................. H04M 9/00; H04M 9/08

(52) U.S. Cl. ........................... 379/406.01; 379/390.02; 379/406.04; 379/406.16

(58) Field of Search ....................... 379/406.01–406.16; 370/286

(56) References Cited

U.S. PATENT DOCUMENTS

| | | | | | |
|---|---|---|---|---|---|
| 5,646,990 | A | * | 7/1997 | Li ........................... | 379/406.08 |
| 5,721,730 | A | * | 2/1998 | Genter ....................... | 370/288 |
| 5,982,755 | A | * | 11/1999 | Forrester et al. ............ | 370/278 |
| 6,272,106 | B1 | * | 8/2001 | Kawahara et al. .......... | 370/201 |
| 6,385,176 | B1 | * | 5/2002 | Iyengar et al. .............. | 370/286 |
| 6,434,110 | B1 | * | 8/2002 | Hemkumar .................. | 370/201 |
| 6,574,336 | B1 | * | 6/2003 | Kirla ....................... | 379/406.01 |

OTHER PUBLICATIONS

*Digital Signal Processing in Telecommunications* by Kishan Shenoi, Prentice–Hall, 1995, Chapter 6 (pp. 334–385).

*Analysis of Subband Impulse Responses in Subband Echo Cancelers*, Eneroth & Gänsler, Signal Processing Report SPR–46, Jul. 1999; available at url: www.es.lth.se/ sig/publ/spr/SPR–46.pdf.

*A Frequency Domain Adaptive Echo Canceller with Post–Processing Residual Echo Suppression by Decorrelation*, Eneroth & Gänsler, Signal Processing Report SPR–40, Nov. 1997; available at url: www.es.lth.se/sig/publ/ spr/SPR/SPR–40.pdf.

Data sheet CS6420 Full–Duplex Speaker Phone Chip, Jun. 1997, Cirrus Logic, Inc.

ICs for Communications, *Acoustic Echo Canceller*, PSB2170, Version 1.1, Data Sheet Jan. 1998 Siemens AG.

ICs for Communications, *Acoustic Echo Canceller*, PSB2170, Version 2.1, Preliminary Data Sheet Oct. 1999 infineon technologies.

* cited by examiner

Primary Examiner—Curtis Kuntz
Assistant Examiner—Tuan Pham
(74) Attorney, Agent, or Firm—Paul F. Wille (57) ABSTRACT

Sub-band filtering, adaptive echo cancellation, and residual echo suppression are selectively and separately applied in hierarchical order under the control of a circuit that monitors four separate signals to determine n machine states. The number of machine states is further divided among m levels of noise in determining which, and how much of, sub-band filtering, adaptive echo cancellation, and residual echo suppression to use at any given time. A voice activity detector (VAD) is used to monitor each signal and provides statistical information in addition to whether or not a voice signal is detected. Sub-band filter, echo cancelling, and non-linear processing are not permitted to provide maximum reduction simultaneously. Even so, the invention provides at least 15 dB more echo suppression than systems without a sub-band filter bank series coupled with a non-linear processor in each channel.

28 Claims, 9 Drawing Sheets

State Table

| A | B | C | D | DT | Rx | Tx | Q |
|---|---|---|---|----|----|----|---|
| 1 | 1 | 1 | 1 | 1 | 0 | 0 | 0 |
| 1 | 1 | 1 | 0 | 0 | 0 | 1 | 0 |
| 1 | 1 | 0 | 1 | 0 | 0 | 1 | 0 |
| 1 | 1 | 0 | 0 | 0 | 0 | 1 | 0 |
| 1 | 0 | 1 | 1 | 0 | 1 | 0 | 0 |
| 1 | 0 | 1 | 0 | 0 | 1 | 0 | 0 |
| 1 | 0 | 0 | 1 | 1 | 0 | 0 | 0 |
| 1 | 0 | 0 | 0 | 0 | 0 | 1 | 0 |
| 0 | 1 | 1 | 1 | 1 | 0 | 0 | 0 |
| 0 | 1 | 1 | 0 | 1 | 0 | 0 | 0 |
| 0 | 1 | 0 | 1 | 1 | 0 | 0 | 0 |
| 0 | 1 | 0 | 0 | 0 | 0 | 0 | 1 |
| 0 | 0 | 1 | 1 | 0 | 1 | 0 | 0 |
| 0 | 0 | 1 | 0 | 0 | 1 | 0 | 0 |
| 0 | 0 | 0 | 1 | 0 | 1 | 0 | 0 |
| 0 | 0 | 0 | 0 | 0 | 0 | 0 | 1 |

FIG. 7

| Full Duplex | | | | | | |
|---|---|---|---|---|---|---|
| | Call State | Sub-Band | Tx NLP | Rx NLP | AEC | LEC |
| Low Noise | Tx | By-pass | * | * | Freeze | Adapt |
| | Rx | -1 dB | * | * | Adapt | Freeze |
| | DT | -15 dB | * | * | Freeze | Freeze |
| | Q | -6 dB | * | * | Freeze | Freeze |
| High Noise | Tx | -3 dB | * | * | Freeze | Adapt |
| | Rx | -3 dB | * | * | Adapt | Freeze |
| | DT | -15 dB | * | * | Freeze | Freeze |
| | Q | -6 dB | * | * | Freeze | Freeze |
| Horrid Noise | Tx | -15 dB | * | * | Freeze | Reset |
| | Rx | -15 dB | * | * | Adapt | Freeze |
| | DT | -15 dB | * | * | Freeze | Freeze |
| | Q | -6 dB | * | * | Freeze | Freeze |

* varies: e.g. 0, -6, -12, -18, -24 dB

FIG. 8

| Half Duplex | | | | | |
|---|---|---|---|---|---|
| Call State | Sub-Band | Tx NLP | Rx NLP | AEC | LEC |
| Tx | By-pass | 0 dB | -36 dB | Adapt | Reset & Adapt |
| Rx | -1 dB | -36 dB | 0 dB | Freeze | Freeze |
| DT (Tx > Rx) | -15 dB | 0 dB | -18 dB | Freeze | Disconnect |
| DT (Rx > Tx) | -15 dB | -18 dB | 0 dB | Adapt | Disconnect |
| Q | -6 dB | * | * | Freeze | Freeze |

* varies: e.g. 0, -6, -12, -18, -24 dB

FULL DUPLEX ECHO CANCELLING CIRCUIT

BACKGROUND OF THE INVENTION

This invention relates to echo cancellation in telephones and, in particular, to operating a telephone in full duplex operation in the presence of an open acoustic path. As used herein, "telephone" includes cellular telephones.

There are two kinds of echoes in telephones, an acoustic echo from the path between an earphone or a speaker and a microphone and a line echo generated in the switched network for routing a call between stations. Acoustic echo is typically not much of a problem in a wired telephone with a handset. For speaker phones and cell phones, acoustic feedback is much more of a problem. In a speaker phone, a room and its contents becomes part of the audio system and provide an acoustic path from speaker to microphone. In a cell phones, the case provides an acoustic path from speaker to microphone.

There are several potential sources for line echoes. Hybrid devices (two-wire to four-wire converters) located at terminal exchanges or in remote subscriber stages of a fixed network are the principal sources of line echo.

Echo is an instability in a system depending upon gain and delay. An echo is perceived if a delay is greater than approximately twenty milliseconds at normal listening levels. At higher gains, shorter delays can be perceived as a ringing tone. The distance that a signal travels causes a minimum delay. Digital calling apparatus further delays a signal in the digitizing process and in the batch (packet) mode that signals are often handled. Using a satellite relay can add considerably to the delay; a minimum of 250 milliseconds each way. Digital packet transmission through a satellite can produce a delay in excess of 600 milliseconds. Modern network equipment is incapable of handling a delay longer than about 100 milliseconds. Acoustic delays, such as reverberations in a room, can be much longer, up to 1,500 milliseconds.

In a constantly changing environment, such as a telephones, both electronic delays and acoustic delays can change during a call. In the prior art, the settings for an echo cancelling circuit are not changed during a call, largely due to a long convergence time in the circuitry for finding and cancelling an echo. Changing settings during a call would cause noticeable distortion in the sound, somewhat like listening to a recording on magnetic tape when the tape is deformed.

Apparatus for removing or minimizing echoes include echo suppressers, echo cancellers, and adaptive filters; see *Digital Signal Processing in Telecommunications* by Kishan Shenoi, Prentice-Hall, 1995, Chapter 6 (pages 334–385). "Suppression" is attenuation. Echo cancelling involves subtracting a local replica of the echo from the signal to eliminate an echo. The local replica is created by filtering the signal with an adaptive filter. The adaptive filter models either the near-end (speaker to microphone) or the far end (line out to line in) transfer function, which is assumed to be linear and time invariant; Shenoi, pg. 348. Unfortunately, the assumption is somewhat optimistic.

U.S. Pat. No. 6,282,176 (Hemkumar) and U.S. Pat. No. 6,212,273 (Hemkumar et al.) also discuss the problem of a non-linear echo path. It is proposed to avoid clipping by using automatic gain control. Poor speaker quality is noted as a problem but is not quantified. The data sheet for Speakerphone Chip CS6420, supplied by patentee, Cirrus Logic, Inc., quantifies quality as a speaker having less than two percent total harmonic distortion. Unfortunately, such speakers are expensive and not likely to be found in a speaker phone or any other communication device. When non-linearities are encountered, the system must go half duplex to avoid divergence and distortion. The noticeable drop in signal amplitude to one party is disconcerting.

Filtering a voice signal to eliminate either or both kinds of echo is a particular form of attenuation known in the art. Devices known as complementary comb filters eliminate echoes by having the signal to a speaker filtered through the pass bands of a first comb filter, thereby falling within the stop bands of a second, complementary comb filter coupled to a microphone. Matching, rather than complementary, comb filters can be used in the line out and line in channels of a telephone if one also uses a frequency shift; see U.S. Pat. No. 5,386,465 (Addeo et al.). Frequency shifting is undesirable because of the adverse effect on the quality of the voice signal.

Even with well designed band pass filters, a comb filter necessarily reduces the power and spectral content of speech. For example, an amplitude peak may happen to fall within the stop band of a comb filter, substantially changing the sound characteristic of a person's voice. When fricatives fall within a stop band, intelligibility can be significantly reduced. Amplification is not a cure if the filters do not match the spectral response of an person's voice.

In other applications, e.g. automotive cellular telephones, certain sounds are noises characteristic of the vehicle or environment rather than the driver and it would be desirable to have a stop band match the dominant frequency of the noise. Again, comb filters of the prior art cannot remove such noise except by chance.

The tools primarily used in the prior art for removing echoes are an adaptive echo canceller and residual echo suppression (e.g. attenuation and center clipping). The Siemens/Infineon PSB2170 Acoustic Echo Cancelling chip goes a step further to include a Wiener filter in the transmit channel to achieve additional attenuation (−30 dB vs. −20 dB without the filter). A problem with this approach is that adding a filter in series also adds delay to a channel. In the case of the Wiener filter, the data sheet for the PSB2170 indicates a delay of 38–43 ms, as opposed to a delay of less than 1 ms. without the filter. The data sheet also discloses that the Wiener filter is by-passed when speech is detected, as it must be because any delay longer than about 20 ms. is perceptible.

An adaptive echo canceller can use a variety of filters because the canceller is in parallel with the delay path, not in series with it. Up to a point, delay is helpful in an adaptive echo canceller. The data sheet for the PSB2170 chip discloses (page 32) using sub-band filtering in the adaptive echo canceller portion of the circuit.

While the prior art is replete with improvements to either an adaptive echo canceller or a residual echo suppresser, or both, the fact remains that, under typical conditions, a telephone call on a speaker phone that has full duplex capability and the ability to select either mode operates in full duplex less than half the time. This does not include speaker phones that have full duplex capability and are set to half duplex by an installer and does not include the host of half duplex speakerphones in use. Having full duplex capability and not being able to use it is simply a waste of money.

In view of the foregoing, it is therefore an object of the invention to provide improved apparatus for cancelling acoustic echoes and line echoes in telephones while providing full duplex operation most (>90%) of the time during typical operating conditions.

Another object of the invention is to provide an echo cancelling circuit that is less sensitive to non-linearities in the echo path than circuits of the prior art.

A further object of the invention is to provide an echo cancelling circuit that separately and selectively applies suppression, sub-band filtering, and adaptive echo cancelling to a signal to provide as much as 60 dB suppression of an echo.

Another object of this invention is to provide a minimum of 40 dB of echo suppression in a telephone.

SUMMARY OF THE INVENTION

The foregoing objects are achieved in this invention in which sub-band filtering, adaptive echo cancellation, and residual echo suppression are selectively and separately applied under the control of a circuit that monitors four separate signals to determine n machine states. The number of machine states is further divided among m levels of noise in determining which, and how much of, sub-band filtering, adaptive echo cancellation, and residual echo suppression to use at any given time. A voice activity detectors (VAD) is used to monitor each signal and, in a preferred embodiment of the invention, provides statistical information in addition to whether or not a voice signal is detected. The sub-band filtering can emulate a comb filter but is vastly more flexible. In a preferred embodiment, the sub-band filtering uses variable gain, multiplexed filters that can be combined in any desired pattern. Echo suppression can be used to reduce acoustic echo and line echo. The echo reducing techniques are used in hierarchical order; sub-band filter first, echo cancelling second, and non-linear processing third. The three techniques are not permitted to provide maximum reduction simultaneously. Even so, the invention provides at least 15 dB more echo suppression than systems without a sub-band filter bank and a non-linear processor coupled in series in each channel.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
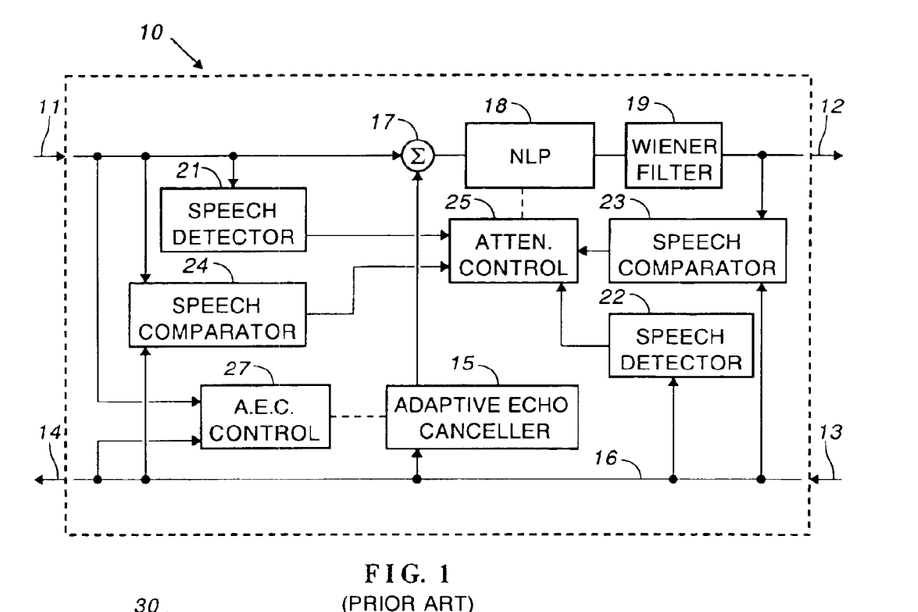
FIG. 1 is a block diagram of an acoustic echo reducing circuit constructed in accordance with the prior art.

In FIG. 1, telephone 10 includes a first channel or transmit channel between microphone input 11 and line output 12 and a second channel or receive channel between line input 13 and speaker output 14. Only apparatus relevant to acoustic echo cancellation is shown in telephone 10; i.e. there is a great deal of additional circuitry in each channel in an actual telephone.

Adaptive echo canceller 15 has an input coupled to receive channel 16 and an output coupled to summation network 17. Adaptive echo canceller 15 includes a finite impulse response (FIR) filter, the coefficients of which are adjusted to model the acoustic echo path between speaker output 14 and microphone input 11. The output of summation network 17 is coupled through non-linear processor (NLP) 18 to Wiener filter 19. The output of filter 19 is coupled to line output 12. NLP 18 includes attenuation and gain control circuitry for reducing the portions of an echo that are not cancelled in summation network 17. Wiener filter 19 provides further attenuation of selected components.

Adaptive echo canceller 15 is controlled by a first control circuit including controller 27, which has inputs coupled to the microphone input and the speaker output of telephone 10. NLP 18 is controlled by a second control circuit including attenuation controller 25, which has inputs coupled to speech detector 21, speech detector 22, speech comparator 23, and speech comparator 24. The control circuits are described in the data sheet for the PSB 2170 acoustic echo canceller. The echo canceller has three operating states. The first is transmit only, the second is receive only, and the third is with both channels on but equally attenuated. As noted above, detecting speech in the transmit channel causes the Wiener filter to be by-passed.

Figure 2:
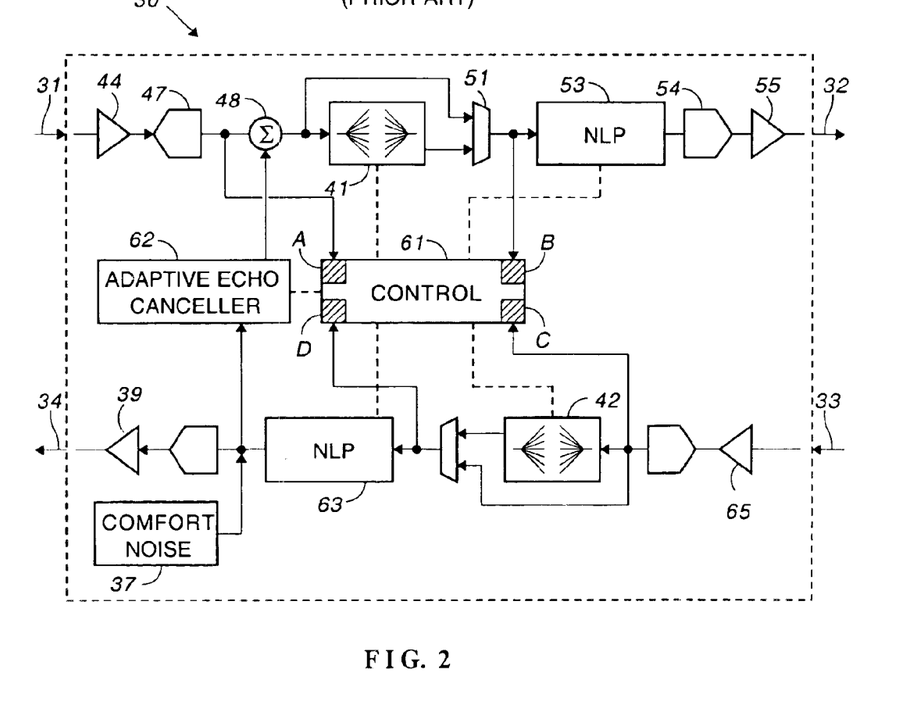
FIG. 2 is a block diagram of an acoustic echo reducing circuit constructed in accordance with a preferred embodiment of the invention.

In FIG. 2, telephone 30 is constructed in accordance with a preferred embodiment of the invention, a first channel (from microphone input 31 to line output 32) differs from a second channel (from line input 33 to speaker output 34) by the presence of comfort noise generator 37 in the second channel and the absence of an adaptive echo canceller in the second channel. The symmetry of the apparatus does not mean that each channel operates identically, e.g. that the gain settings of corresponding components is the same. On the contrary, the signal on microphone input 31 is almost always different from the signal on line input 33 in spectral content and amplitude. The asymmetry in operation, particularly with respect to sub-band filters 41 and 42, is one of several features of the invention.

Amplifier 44 is coupled to microphone input 31 and provides variable gain. Either programmable or automatic gain control can be used to optimize signal strength and range for analog to digital (A/D) converter 47. The output of converter 47 is coupled through summation circuit 48 to sub-band filter 41, described in more detail in FIGS. 3 and 4. The output from sub-band filter 41 is coupled through multiplex circuit 51 to non-linear processing (NLP) circuit 53, which includes a noise reduction circuit, a residual echo cancelling circuit, and a center clipper connected in any order between multiplex circuit 51 and digital to analog (D/A) converter 54. Multiplex circuit 51 allows the sub-band filters to be by-passed under certain conditions. Amplifier 55 couples the output of D/A converter 54 to line output 32 and provides suitable impedance matching and signal levels for line output 32.

Non-linear processing refers to the additional processing techniques that are applied to reduce residual echo signals after the application of adaptive cancellation. Traditionally NLP techniques are employed only during single talk situations by increasing attenuation or suppression of residual echo and are inactive during double talk. More sophisticated controls have been applied that even allow for adaptive additional suppression even during double talk. The most advanced techniques monitor the level of residual echo to determine if echo return loss estimates (ERLE) targets have been met. If excessive residual echo remains prohibiting meeting the ERLE goal, the NLP calculates and applies the correct level of additional suppression (on either the near end or far end or both sides of the call) to meet the specified ERLE.

Monitoring and detecting the ambient or background level and other noise source characteristics as well as voice activity detection provide detailed information to insure that the proper amounts of non-linear suppression are applied. Control circuit 61 includes four voice activity detectors having inputs coupled as shown to different points in the receive channel and the transmit channel. For example, a VAD could be coupled to the output of summation circuit 48 rather than to the input and a VAD could be coupled to the output of NLP circuit 53 rather than to the input.

Adaptive echo canceller 62 has an input coupled to the output of NLP circuit 63 and an output coupled to summation network 48. Adaptive echo canceller 62 includes a finite impulse response (FIR) filter, the coefficients of which are adjusted to model the acoustic echo path between speaker output 34 and microphone input 31. The construction and operation of adaptive echo cancellers is known per se in the art.

During periods of silence, maximum attenuation, or minimum gain in the receive channel, comfort noise generator 37 is activated to inject a low level of noise into the signal on speaker output 34. Control circuit 61, which preferably includes programmable logic or a microprocessor, controls the operation of at least sub-band filters 41 and 42, NLP circuits 53 and 63, and adaptive echo canceller 62 in accordance with data from the four voice activity detectors or from data stored in registers within control circuit 61. Amplifiers, such as amplifiers 44 and 65, can be operated by control circuit 61 or be in local feedback loops for automatic gain control.

Figure 3:
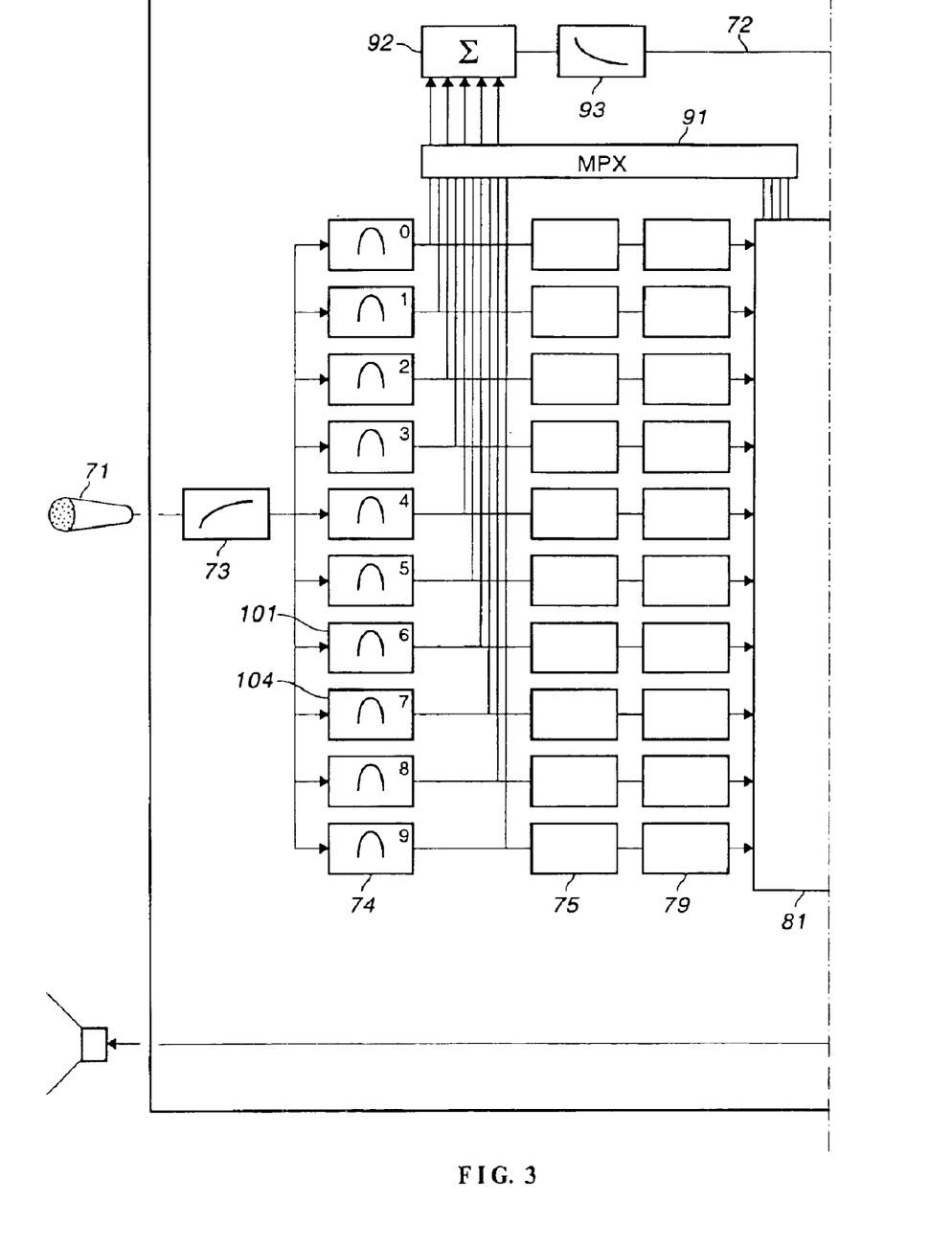
FIG. 3 is a block diagram of the microphone to line output channel in a telephone constructed in accordance with the invention.
Figure 4:
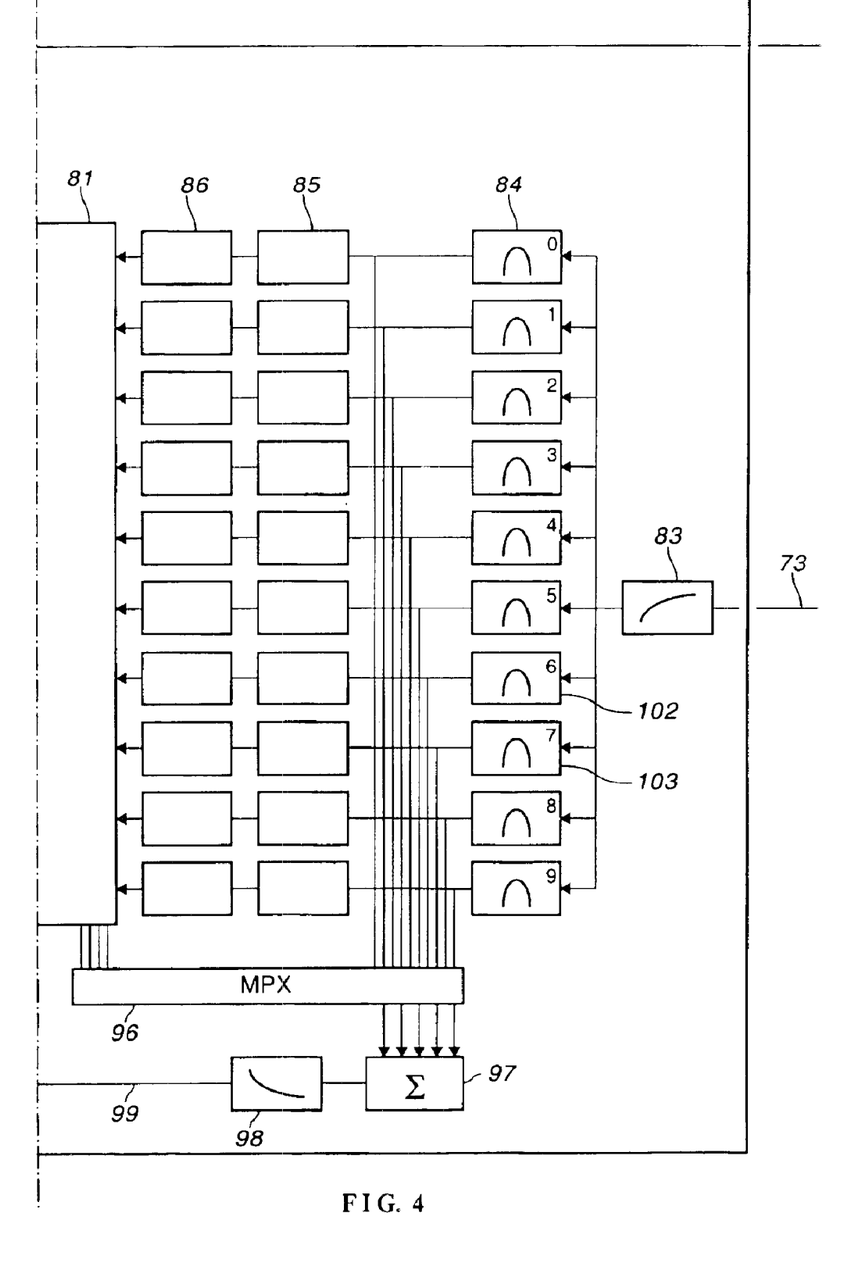
FIG. 4 is a block diagram of the line input to speaker channel in a telephone constructed in accordance with the invention.

FIGS. 3 and 4 together illustrate the operation of sub-band filters 41 and 42. FIG. 3 is a block diagram of a transmit channel and FIG. 4 is a block diagram of a receive channel. A handset (not shown) may be included in the telephone and coupled to the lines by appropriate switching circuitry. Filters in each bank can be allocated between two channels in any desired grouping. One can attenuate alternate filters to produce complementary comb filters. In complementary comb filters of the prior art, alternate sub-bands are omitted, not attenuated. In the sub-band filters illustrated in FIGS. 3 and 4, all sub-bands are available to each channel. Thus, one can group the filters according to the spectral content of each channel, which can not be done with complementary comb filters of the prior art.

The sub-band filters are preferably one-third octave filters and are preferably implemented as low order (one to four poles) infinite impulse response (IIR) filters for minimal (1.5–3 ms.) delay. A sub-set of these filters is chosen in each channel to provide full duplex operation. Although a low order IIR filter does not have steep skirts in its response curve and appears unsuitable, it has been found that such filters work quite well in the context of the invention. The phase distortion usually associated with IIR filters, making them undesirable, is less with low order filters and occurs near the center of the pass band. The overlap in frequency response between adjacent bands is minimized by initially selecting alternate bands and/or by reversing the phases of the signals in adjacent bands. Any low order filter exhibiting an insertion delay of less than five milliseconds can be used for a sub-band filter.

Sound incident upon microphone 71 (FIG. 3) is converted into an electrical signal and coupled to weighting filter 73. Weighting filter 73 reduces the amplitude of low frequency signals to provide a more even energy distribution among the bands. Filter 73 can also be used to correct for non-linearities in the frequency response of microphone 71. The output from filter 73 is coupled to a first plurality of band pass filters, e.g. one-third octave filters, having progressively higher center frequencies. Much of the apparatus in FIG. 3 is duplicative and only one band is described.

Band pass filter 74 is coupled to filter 73 and to amplitude detector 75, which, for example, includes a rectifier and a low pass filter. More complex amplitude detectors can be used instead. The output from amplitude detector 75 is coupled to sample and hold circuit 79, which provides a stable signal for controller 81.

Weighting filter 83 (FIG. 4) receives signals from line input 73 and is coupled to a second plurality of band pass filters. Band pass filter 84 is coupled to filter 83 and to amplitude detector 85. The output from amplitude detector 85 is coupled to sample and hold circuit 86. Controller 81 receives the signals from all the sample and hold circuits and contains the logic for comparing the amplitudes of the signals in each band in each channel. Controller 81 is part of control circuit 61 (FIG. 2).

In FIG. 3, controller 81 is coupled to the control inputs of multiplex circuit 91. Each band pass filter, such as filter 74, has an output coupled to a signal input of multiplex circuit 91, which has a plurality of signal output lines coupled to summation circuit 92. The output of summation circuit 92 is coupled to de-weighting filter 93, which has the inverse frequency response of filter 73. The output of de-weighting filter 93 is coupled to line output 72.

In FIG. 4, controller 81 is coupled to the control inputs to multiplex circuit 96. Each band pass filter, such as filter 84, has an output coupled to a signal input of multiplex circuit 96, which has a plurality of signal output lines coupled to summation circuit 97. The output of summation circuit 97 is coupled to de-weighting filter 98, which as the inverse frequency response of filter 83. The output of de-weighting filter 83 is coupled to speaker output 99.

Multiplex circuit 91 and multiplex circuit 96 are each preferably implemented as a plurality of amplifiers having variable gains individually set by controller 81. In this way, the spectral content of each channel can be finely tuned for each telephone call. The output from each filter can be adjusted from fully attenuated or minimum gain to maximum amplitude or full gain.

With all the data flowing into controller 81, the filters can be allocated several different ways. For example, filter 101 (FIG. 3) and filter 102 (FIG. 4) have substantially the same center frequency. If filter 101 produces the loudest signal of all, then the output from filter 101 is coupled to summation circuit 92 by multiplex circuit 91. The output signal from filter 102 is attenuated by multiplex circuit 96, while the output signal from filter 103 is less attenuated. Alternate filters in each bank are enabled, allocating the ten bands between the two channels. In this mode, amplifiers in multiplex circuits 91 and 96 are at either minimum gain or maximum gain. While useful as an initial adjustment, the gains are further modified to provide the maximum spectral content possible under a given set of conditions.

Figure 5:
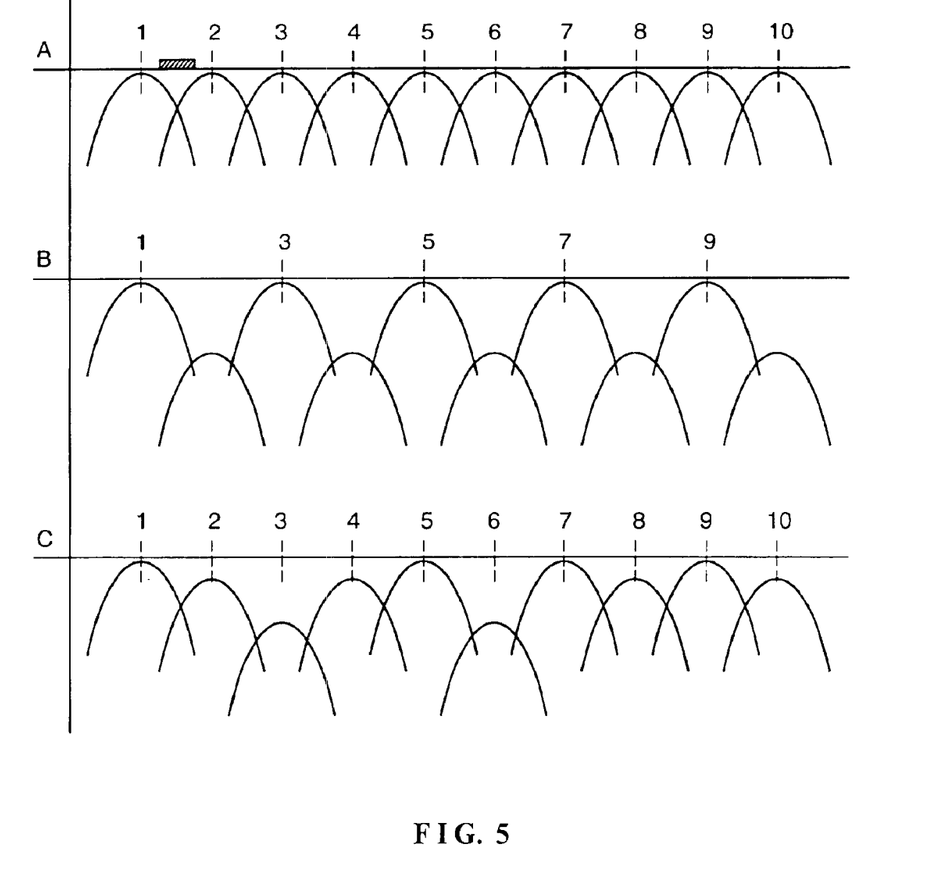
FIG. 5 is a chart illustrating the operation of a sub-band filter.

Depending upon the state of the machine, the gain of some filters in each bank can be adjusted to accommodate the frequency spectrum of the signals in each channel. FIG. 5 illustrates the operation of one bank of filters. Waveform "A" shows all filters at maximum gain. As described above, the filters are low order filters and the frequency response curves for the filters do not have steep skirts. During initial operation, the gain of alternate filters is reduced, producing a complementary comb filter response, as illustrated in waveform "B." During a call, further adjustment of the filters can result in the response curves shown in waveform "C." The result is no longer complementary comb filters but a pair of filter banks that provide the maximum possible spectral content under the particular circumstances found by the voice activity detectors. As a result, except for very noisy conditions, the telephone operates in full duplex all the time. In addition, the sub-band filters are immune to non-linearities in the echo path and can be used whether or not there are non-linearities in the echo path. That is, non-linearities do not require half duplex operation as in the prior art.

Figure 6:
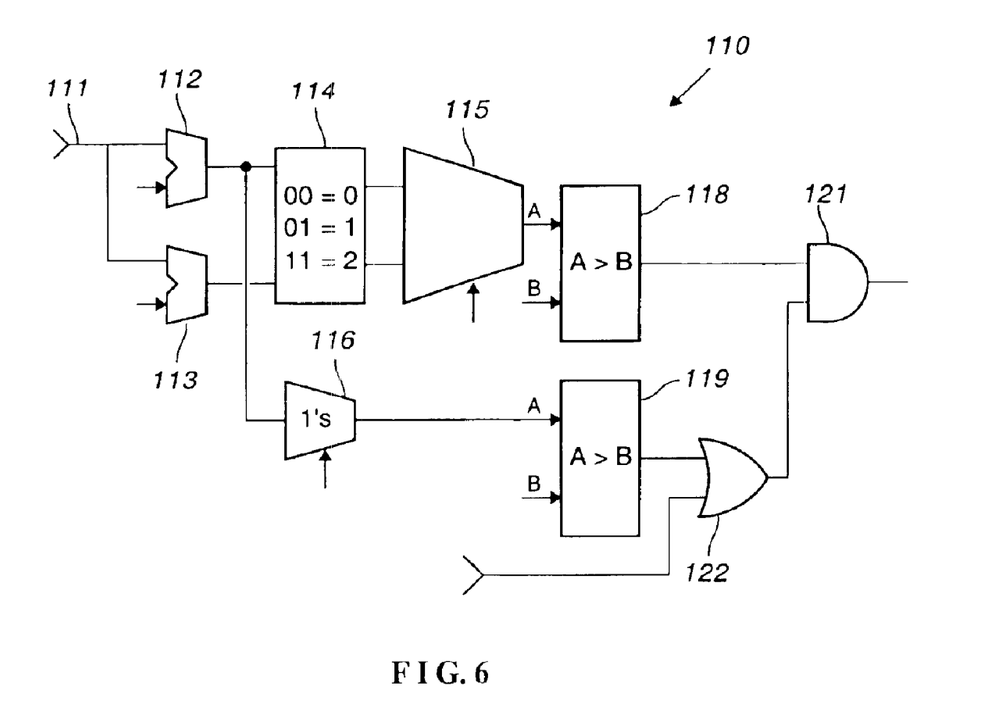
FIG. 6 is a block diagram of a preferred embodiment of one of the voice activity detectors in control circuit 61 (FIG. 2)

FIG. 6 is a block diagram of a preferred embodiment of one of the voice activity detectors in control circuit 61 (FIG. 2). Other VADs, known in the art, could be used instead, although four identical VADs are preferably used. The VADs are identical in terms of circuitry, not in terms of the parameters controlling the VADs.

A digital signal on input 111 is coupled to one input of comparator 112 where it is compared with a first threshold. The digital signal on input 111 is also coupled to one input of comparator 113 where it is compared with a second threshold, which is lower than the first threshold. The thresholds are adjustable and can be set by control circuit 61 (FIG. 2). The outputs of comparators 112 and 113 are coupled to decoder 114, which decodes the signals to produce a binary output of 00 (zero), 01 (one), or 10 (two). Accumulator 115 adds the output from decoder 114 to the previous sum on each clock signal for one hundred twenty-eight cycles. Accumulator 115 sums for 2.9 milliseconds and then resets to zero. Accumulator 116 counts the number of ones from comparator 112.

Decoder 114 can produce any three numbers in response to the signals on its inputs. In this way data can be skewed or weighted to exaggerate the occurrence of a signal in a particular area, e.g. between the thresholds. A sum is easily and rapidly obtained with very simple hardware and avoids complex calculations for measuring power while obtaining data that represent the rms power of an input signal. A sum is one form of what is referred to herein as statistical data.

Another form of statistical data is a count of events, e.g. the number of times a threshold is exceeded. A count can also be weighted. The result is an extremely flexible system that rapidly analyzes an input signal using relatively simple hardware.

VAD 110 is fast because one is creating a sum, not doing a series of complex calculations. Voice detection is easy, quick, and reliable. Less apparent is the fact that the circuit enables one to simulate a root mean square (RMS) calculation without actually having to make the calculation. The sum in accumulator 114 is indicative of RMS power, although not an exact measure. The circuit thus avoids a significant problem with complex calculations in the, prior art by linear interpolation of a higher order function.

Another subtle but important advantage of VAD 110 is the fact that, while only two bits are being produced, the resolution of the circuit is determined by the resolution of the analog to digital (A/D) converters used to digitize the input signal. If a sixteen-bit A/D converter is used, than the resolution of the circuit is approximately $V_{MAX}/64,000$, not just $V_{MAX}/4$ as might be inferred from output data of only two bits. In a preferred embodiment of the invention, the digital comparators work only on the six most significant bits (MSB) of data, which greatly simplifies implementing the invention and increases the speed of the circuit.

The sum in accumulator 115 is compared with a threshold and the output of comparator 118 is coupled to AND gate 121. VAD 110 includes second comparator 119 having an input coupled to the output of accumulator 116, which counts peaks, i.e. the number of times that the upper threshold (into comparator 112) is exceeded. The total from accumulator 116 is compared with another threshold by comparator 119 and the output of comparator 119 is coupled to one input of OR gate 122. Another input to OR gate 122 is coupled to logic (not shown) that provides a logic "1" (true) if the upper threshold is at its minimum. Constructed as shown in FIG. 5, the output from AND gate 121 is a logic "1" if signal accumulator 114 is above the threshold into comparator 118 AND (the number of peaks is above a threshold OR the peak threshold is at its minimum). A logic "1" from AND gate 121 indicates that voice is detected.

In FIG. 2, telephone 30 includes voice activity detector A coupled to microphone input 31, voice activity detector B coupled to line output 32, voice activity detector C coupled to line input 33, and voice activity detector D coupled to speaker output 34. In particular, voice activity detector B is coupled the output of band pass filter bank 41 and voice activity detector D is coupled to the output of band pass filter bank 42. The outputs of the four voice activity detectors are part of control circuit 61, which controls filter bank 41, filter bank 42, and echo cancelling circuit 62. The dashed lines represent control lines rather than signal or data lines.

Figure 7:
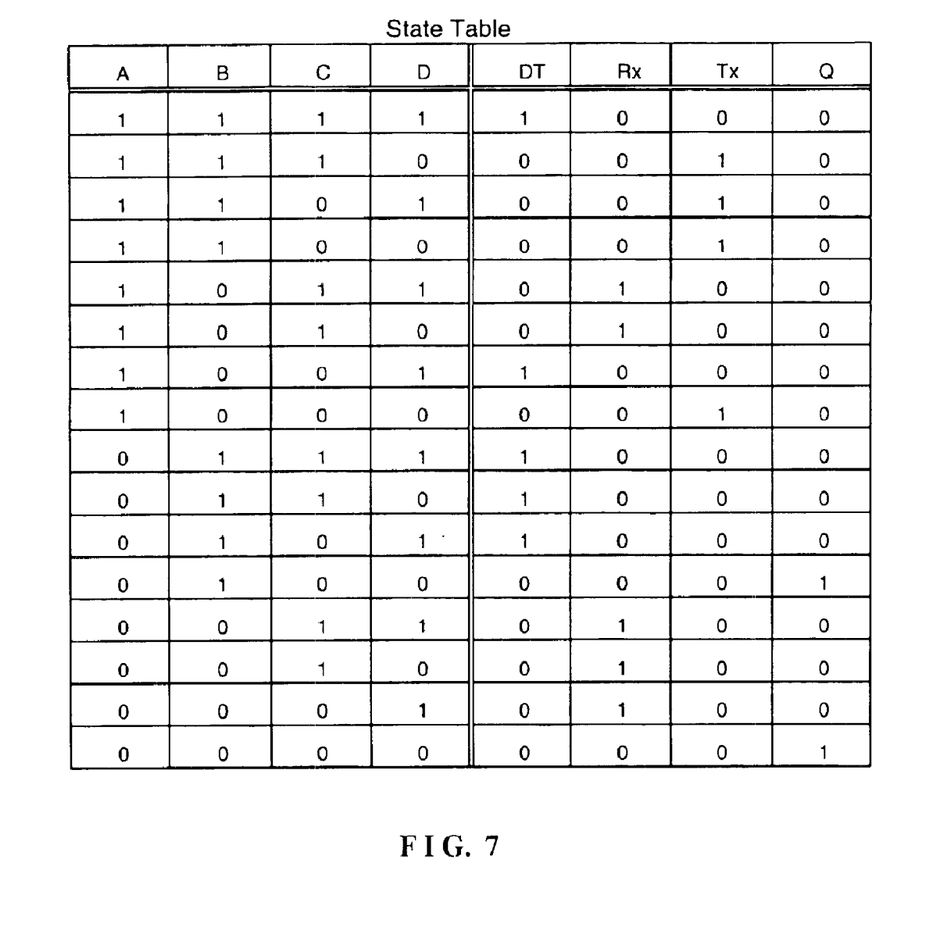
FIG. 7 is a table defining four states according to the outputs of the voice activity detectors.

The sixteen possible data inputs are re-mapped onto four machine states by control circuit 61 as shown in FIG. 7. In the table, "DT" is a double talk state, "Rx" is a receive state, "Tx" is a transmit state, and "Q" is a quiet state. In one embodiment of the invention, the control circuit was an array of logic gates producing the outputs indicated; i.e. fixed or hard coded logic was used. While fixed logic is sufficient for many applications, programmable logic, e.g. using a look-up table, can be used instead.

The voice activity detectors can be separately adjusted for a particular application. In the embodiment illustrated in FIG. 2, voice activity detectors A and C have the same default threshold and weighting values and voice activity detectors B and D have the same default threshold and weighting values. In particular, voice activity detectors B and D exaggerate the difference between low amplitude signals and high amplitude signals more than voice activity detectors A and C. High amplitude signals are given a weight of four rather than two. In part, this is because filter banks 91 and 92 attenuate the signals passing through and some compensation is needed. During a call, the thresholds may vary, depending upon operation conditions.

The following describes signal flow through the transmit channel (input 31 to output 32). A new voice signal entering microphone input 31 may or may not be accompanied by a signal from speaker output 34. Amplifier 44 maintains the input signal within a suitable range for A/D converter 47. The signals from input 31 are digitized in 16-bit A/D converter 47 and coupled to summation network 48. There is, as yet, no signal from echo cancelling circuit 62 and the data proceeds to filter bank 41, which can be by-passed by using multiplexer 51. All filters are initially set to minimum attenuation. Voice activity detector B, looking at the six most significant bits, senses a large output that could possibly contain an echo and causes filter bank 41 to go to open alternate sub-bands. Filter bank 42 is made to open the complementary set of sub-bands.

The filter banks are now configured as complementary comb filters. The signal from microphone input 31 has its spectrum reduced to the pass bands of half the filters in filter bank 41. Similarly, the signal from line input 33 has its spectrum reduced to the pass bands of half the filters in filter 42. A full spectrum signal passing through either filter alone is attenuated approximately −3 dB. A signal passing through filter bank 42 and then through filter bank 41, configured as complementary comb filters, is attenuated approximately −15 dB.

After the filters are configured as complementary comb filters, two things can happen. The signal through filter bank 41 might now be attenuated approximately −3 dB, indicating new voice, or the signal could be attenuated by more than −3 dB, indicating significant content from the receive side. The situation is now ambiguous because the content from the receive side could be double talk or echo. Voice activity detectors C and D remove this ambiguity.

If voice activity detector C indicates voice but voice activity detector D no longer indicates voice, then there was an echo and it is safe to turn on echo canceller 62. If voice activity detector C indicates voice and voice activity detector D still indicates voice, then there was doubletalk and echo canceller 62 remains off. D/A converter 54 converts the resulting signal back to analog and amplifier 55 provides impedance matching and proper level for line output 32.

Note that the difference in attenuations reliably distinguishes doubletalk from echo, a feature not available in the prior art. By avoiding premature application of echo cancelling techniques, one avoids divergence (failure of control loops to lock) and distortion of the voice signals, which happens if echo cancelling is applied when there is no echo.

While particular embodiments of voice activity detector and filter bank have been identified and are preferred, the invention will work with other forms of voice activity detector and filter bank. The data from the voice activity detectors can be used to control other devices within telephone 30, such as comfort noise generator 37. If neither voice activity detector A nor voice activity detector B detects voice, comfort noise is preferably added to or substituted for the signal from amplifier 39.

The state map in FIG. 6 does not distinguish between half duplex and full duplex operation. The state map represents the first level of analysis that is performed on the incoming signals to control the operations of the three echo reducing circuits, the echo canceller, the sub-filters, and the non-linear processor.

The second level of analysis is noise data collected by the VADs. In a preferred embodiment of the invention, three noise levels are defined; viz. low noise, high noise, and horrid noise. The names and numbers of the noise levels are arbitrary. Fewer than three levels does not appear desirable. More than five levels may make the circuit "hunt" too much to find a solution. Horrid noise and a "quiet" state may seem inconsistent. Recall that the states are based upon the detection of voice, not just any signal and not noise. Thus, one can have no voice detected, i.e. quiet, and horrid noise. This invention relates to echo suppression, not noise suppression, although noise can be attenuated with any other signal passing through the system.

Figure 8:
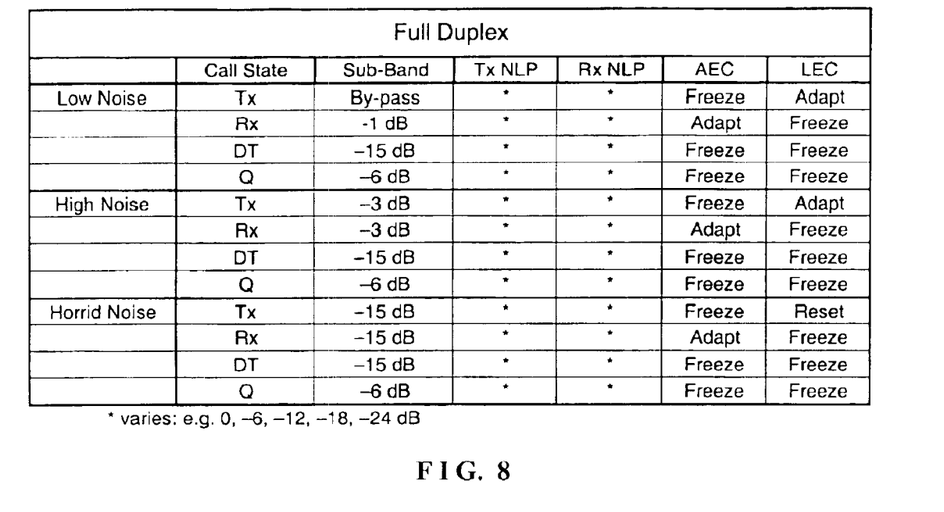
FIG. 8 is a chart showing the response of a system constructed in accordance with the invention to three different noise levels in each of four states.

FIG. 8 is a chart showing the response of a system constructed in accordance with the invention to three different noise levels in each of four states. The right hand column, "LEC," relates to a line echo canceller, not shown in FIG. 2 but shown in FIG. 13. Note that the sub-band filters are only partially attenuated in the quiet state. A "reset" can be implemented in several ways for an echo canceller. In a digital system, data registers in the echo canceller are set to default values and the output is set to zero. Alternatively, only the output is set to zero. As a further alternative, the echo canceller can be bypassed in the same manner as the sub-band filters. In summary, "reset" means that the echo canceller is turned off or of no effect.

Figure 9:
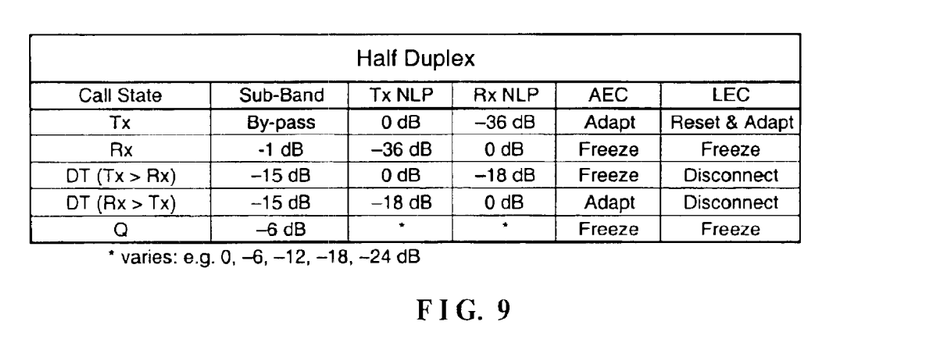
FIG. 9 is a chart of the settings for the three echo reducing circuits during half duplex operation.

FIG. 9 is a chart of the settings for the three echo reducing circuits during half duplex operation. Half duplex operation is limited by timers to no more than one second, often less, before the telephone tries to switch to full duplex operation. This can be done because of the effectiveness of the three-pronged attack on echo. A telephone constructed in accordance with the invention will only switch to half duplex operation if a howl is detected or if echo cancellation does not exceed 6 dB. Howl is a sustained signal that grows in power, as anyone knows who has heard feedback in a public address system, and is detected by the VADs. Switching to half duplex operation stops the howl immediately because the feedback loop is opened. A user hears a brief chirp and then silence. After 250 ms., the system switches back to full duplex. It is possible but very unlikely that howl may re-start. If so, the system switches to half duplex for another 250 ms.

With echo cancellation, the situation is more ambiguous: there are too many possibilities. If echo cancellation does not exceed 6 dB, the system switches to half duplex, resets all registers to default values, then switches to full duplex and starts over. The user may hear a slight echo but hears no clicks, pops, or other sounds.

Figure 10:
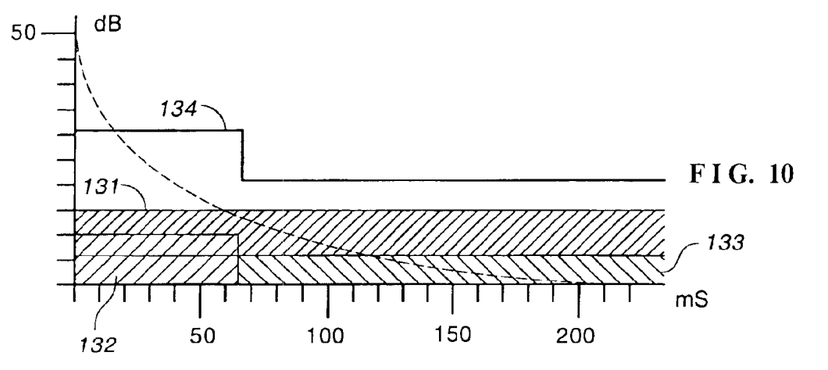
FIG. 10 is a chart illustrating the operation of the invention during double talk or quiet time.
Figure 11:
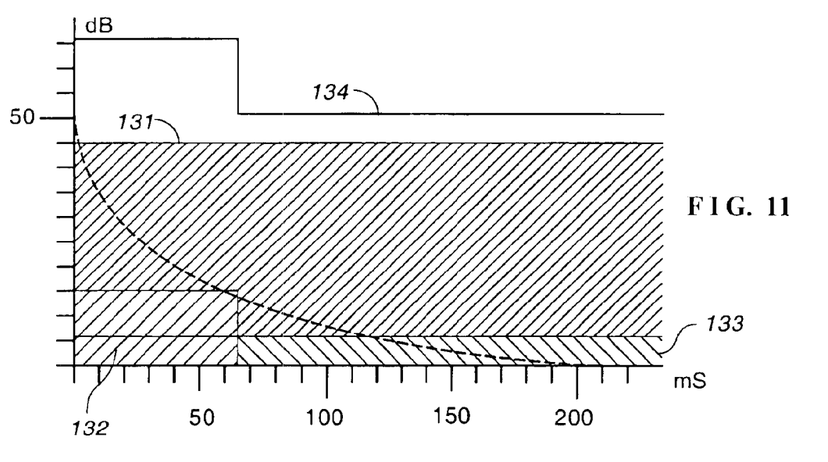
FIG. 11 is a chart illustrating the operation of the invention during single talk listen acoustic echo rejection.
Figure 12:
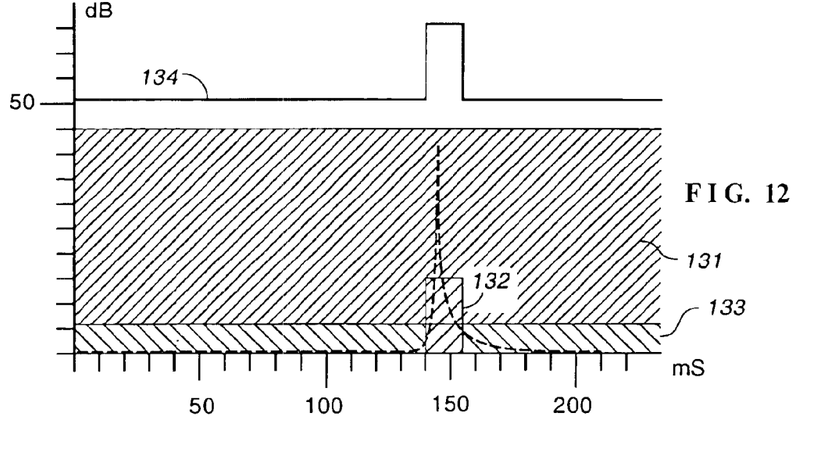
FIG. 12 is a chart illustrating the operation of the invention during single talk network echo rejection.

In FIGS. 10, 11, and 12, area 131 represents the suppression obtained from the sub-band filters; area 132 represents the suppression obtained from the adaptive echo canceller, and area 133 represents the suppression obtained from non-linear processing. Curve 134 represents total echo rejection and is the sum of the three techniques. Non-linear processing is essentially attenuation of the signal and contributes 0–24 dB of suppression. The adaptive echo canceller provides 0–30 dB of cancellation. The sub-band filters, operated as described, provide 0–40 dB of suppression.

The three suppression techniques can be used in any combination (none, some, or all) as set by control circuit 61 and, in accordance with the invention, are used in a hierarchical order. Specifically, sub-band filters are used first, echo cancelling is used second, and non-linear processing is used third. In accordance with the invention, all three techniques are never applied simultaneously as an initial condition. The sub-band filters are applied first. The adaptive echo canceller is not turned on until an echo has been detected. This helps assure duplex operation if at all possible.

Also in accordance with the invention, all three techniques do not apply maximum suppression simultaneously. Adding the maximums of each technique suggests a total attenuation of 94 dB, which is an irrelevant number because the three techniques are not allowed to be maximum simultaneously. In accordance with another aspect of the invention, non-linear processing is minimized to obtain optimum results.

FIG. 10 is a chart showing the suppression of an acoustic echo during double talk. The dashed curve represents a typical room response envelope. FIG. 11 is a chart showing suppression of an acoustic echo during single talk receive. FIG. 12 is a chart showing the suppression of network echo during single talk listen. The dashed curve in FIG. 12 represents a typical network response envelope. Note that in all the charts, non-linear processing did not exceed 6 dB of attenuation.

Figure 13:
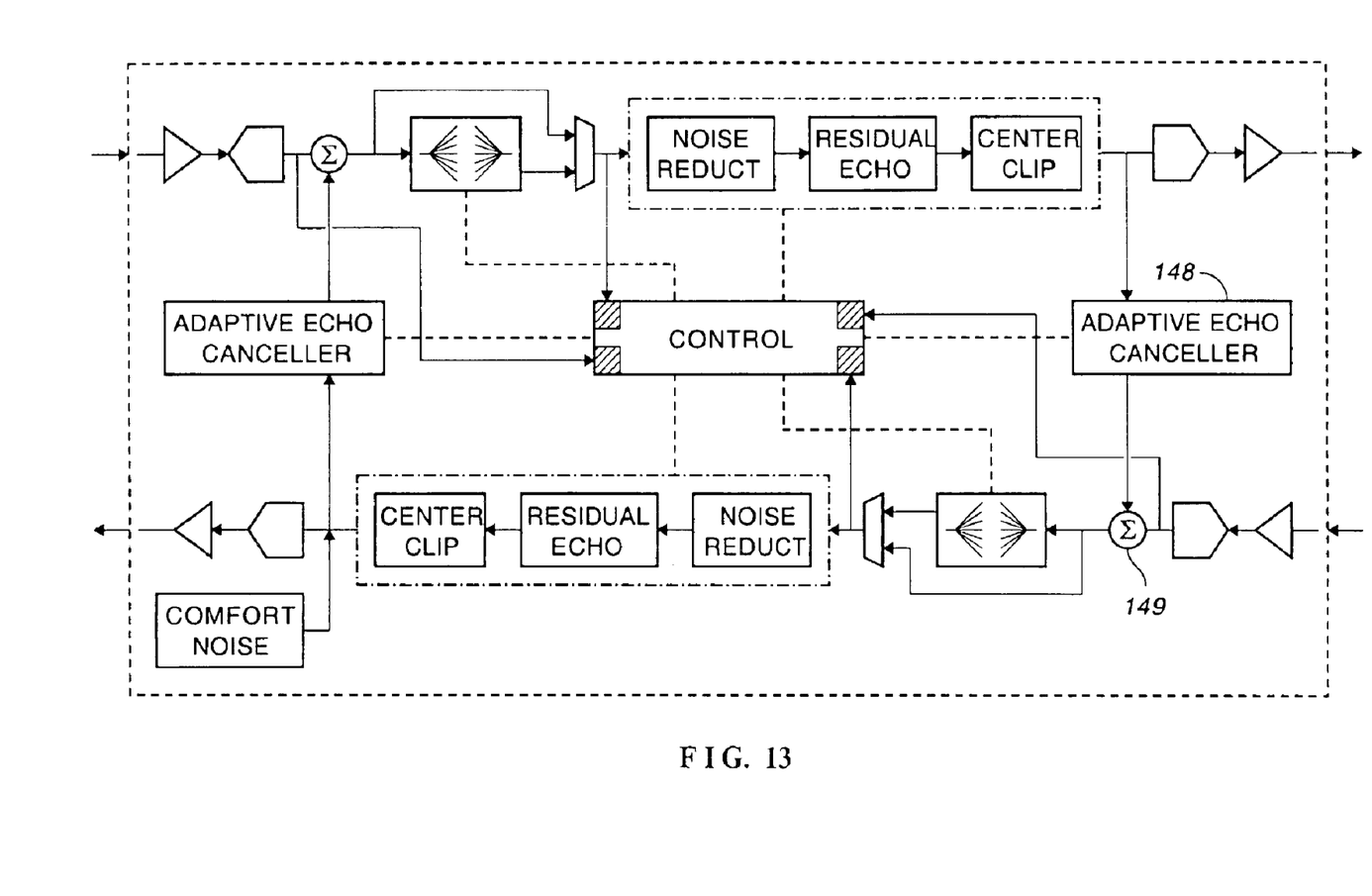
FIG. 13 is a block diagram of a two channel acoustic echo reducing circuit constructed in accordance with a preferred embodiment of the invention.

FIG. 13 is a block diagram of a telephone including both acoustic echo cancelling and line echo cancelling. The circuit of FIG. 13 differs from the circuit of FIG. 2 by the addition of adaptive echo canceller 148 and summation circuit 149. Each of non-linear processors 53 and 63 are shown in greater detail as including a noise suppression circuit, a residual echo canceller, and a center clipper. The circuit operates as shown in the charts illustrated in FIGS. 7, 8, and 9.

The invention thus provides apparatus for suppressing acoustic echoes and electrical echoes in telephones while providing full duplex operation. The echo suppressing circuit is less sensitive to non-linearities in the echo path than circuits of the prior art and provides greater than 60 dB of suppression by selectively applying, in hierarchical order, sub-band filtering, adaptive echo cancelling, and non-linear processing to a signal.

Having thus described the invention, it will be apparent to those of skill in the art that various modifications can be made within the scope of the invention. For example, one can provide a manual override to switch the telephone to half duplex if unusual circumstances cause maladjustment of the telephone by the echo suppression circuitry. By-passing the sub-band filters with a separate path provides maximum spectral content and less phase distortion. On the other hand, one could simply set the gain of each sub-band filter to maximum, which would provide a greater consistency of operation for any subsequent circuitry that was especially phase sensitive. While described in the context of telephones, the invention can be used in any communication system where echo is a problem and full duplex communication is desired.

What is claimed as the invention is:

1. In a telephone having a first channel including a microphone input and a line output and a second channel including a line input and a speaker output, the improvement comprising:
   a sub-band filter bank and a non-linear processor coupled in series in each channel;
   at least one adaptive echo canceller coupled between said first channel and said second channel in parallel with a first echo path;
   a control circuit for controlling said adaptive echo canceller, said sub-band filter bank, and said non-linear processor in varying proportions and hierarchical order to provide at least 15 dB more echo suppression than in systems without a sub-band filter bank and a non-linear processor coupled in series in each channel.

2. The telephone as set forth in claim 1 wherein said filter bank is characterized by an insertion delay of 5 milliseconds or less.

3. The telephone as set forth in claim 1 wherein said control circuit includes four voice activity detectors.

4. The telephone as set forth in claim 3 wherein said control circuit monitors the outputs from said voice activity detectors to select one of four operating states.

5. The telephone as set forth in claim 4 wherein said sub-band filter bank and said non-linear processor each have variable attenuation and said control circuit adjusts the attenuation of said sub-band filter and the attenuation of said non-linear processor according to operating state.

6. The telephone as set forth in claim 4 wherein one of said operating states is a receive state and said control circuit enables said adaptive echo canceller in said receive state.

7. The telephone as set forth in claim 6 wherein said control circuit defines at least two noise levels in accordance with the outputs from the voice activity detectors and adjusts the attenuation of said sub-band filter bank and the attenuation of said non-linear processor according to operating state and noise level.

8. The telephone as set forth in claim 7 characterized in that said control circuit operates said telephone in full duplex mode unless howling is detected by the control circuit.

9. The telephone as set forth in claim 8 characterized in that said control circuit operates said telephone in full duplex unless echo suppression is less than a predetermined amount.

10. The telephone as set forth in claim 9 wherein said predetermined amount is −6 dB.

11. A method for echo suppression in a telephone having a receive channel and a transmit channel, said method comprising the steps of:
   defining a plurality of call states irrespective of noise;
   defining at least two noise levels;
   defining a matrix of operating conditions according to call state and noise level;
   providing a sub-band filter bank and a non-linear processor coupled in series in each channel;
   providing at least one adaptive echo canceller coupled between said receive channel and said transmit channel in parallel with a first echo path;
   operating the sub-band filter bank, the non-linear processor, and the adaptive echo canceller in varying proportions and hierarchical order according to the matrix.

12. The method as set forth in claim 11 further including the step of:
   operating the telephone in full duplex mode only, except for howling.

13. The method as set forth in claim 11 further including the step of:
   operating the telephone in full duplex mode only, unless echo suppression is less than a predetermined amount.

14. The method as set forth in claim 13 further including the steps of:
   operating the telephone in half duplex mode when echo suppression is less than a predetermined amount;
   resetting the matrix to default values; and then
   operating the telephone in full duplex mode.

15. In a telephone having a first channel including a microphone input and a line output and a second channel including a line input and a speaker output, the improvement comprising:
   a sub-band filter bank and a non-linear processor coupled in series in each channel;
   a first adaptive echo canceller coupled between said first channel and said second channel in parallel with a first echo path;
   a second adaptive echo canceller coupled between said second channel and first second channel in parallel with a second echo path;
   a control circuit for controlling the adaptive echo cancellers, said sub-band filter bank, and said non-linear processor in varying proportions and hierarchical order to provide at least 15 dB more echo suppression than in systems without a sub-band filter bank and a non-linear processor coupled in series in each channel.

16. The telephone as set forth in claim 15 wherein said control circuit monitors the outputs from said voice activity detectors to select one of four operating states.

17. The telephone as set forth in claim 16 wherein said control circuit defines at least two noise levels in accordance with the outputs from the voice activity detectors and adjusts the attenuation of said sub-band filter bank and the attenuation of said non-linear processor according to operating state and noise level.

18. In a telephone having a first channel including a microphone input and a line output and a second channel including a line input and a speaker output, the improvement comprising:
   a sub-band filter bank and a non-linear processor coupled in series in each channel;
   a first adaptive echo canceller coupled between said first channel and said second channel in parallel with a first echo path;
   a second adaptive echo canceller coupled between said second channel and first second channel in parallel with a second echo path;
   a control circuit for controlling the adaptive echo cancellers, said sub-band filter bank, and said non-linear processor to provide at least 15 dB more echo suppression than in systems without a sub-band filter bank and a non-linear processor coupled in series in each channel;
   wherein said control circuit monitors the outputs from said voice activity detectors to define at least three operating states, including a receive state and a transmit state, and to further define at least two noise levels;
   wherein said control circuit causes said first adaptive echo canceller to adapt during the receive state regardless of noise level, causes the second adaptive echo canceller to adapt during the transmit state in the lower noise level, and causes the second adaptive echo canceller to reset during the transmit state in the higher noise level.

19. The telephone as set forth in claim 18 wherein said control circuit defines three or more noise levels and causes the second adaptive echo canceller to reset during the transmit state in the highest noise level.

20. In a telephone having a first channel including a microphone input and a line output and a second channel including a line input and a speaker output, the improvement comprising:
   a sub-band filter bank and a non-linear processor coupled in series in each channel;
   at least one adaptive echo canceller coupled between said first channel and said second channel in parallel with a first echo path;
   a control circuit for controlling said adaptive echo canceller, said sub-band filter bank, and said non-linear processor in varying proportions and hierarchical order to provide at least 15 dB more echo suppression than in systems without a sub-band filter bank and a non-linear processor coupled in series in each channel;
   wherein said control circuit monitors the outputs from said voice activity detectors to define at least three operating states, including a receive state and a transmit state, and to further define at least two noise levels;
   wherein said control circuit causes the sub-band filter bank in said first channel to be by-passed during the transmit state in the lower noise level.

21. The telephone as set forth in claim 20 wherein said control circuit defines three or more noise levels and causes the sub-band filter bank in said first channel to be by-passed during the transmit state in the lowest noise level.

22. In a telephone having a first channel including a microphone input and a line output and a second channel including a line input and a speaker output, the improvement comprising:
   a sub-band filter bank and a non-linear processor coupled in series in each channel;
   at least one adaptive echo canceller coupled between said first channel and said second channel in parallel with a first echo path;
   a control circuit for controlling said adaptive echo canceller, said sub-band filter bank, and said non-linear processor in varying proportions and hierarchical order to provide at least 15 dB more echo suppression than in systems without a sub-band filter bank and a non-linear processor coupled in series in each channel;
   wherein said control circuit monitors the outputs from said voice activity detectors to define at least three operating states, including a quiet state characterized by a voice signal not being detected in either channel;
   wherein said control circuit causes the output signals from the sub-band filters in each bank to be partially attenuated during said quiet state.

23. The telephone as set forth in claim 22 wherein the output signals from the sub-band filters in each bank are each attenuated the same amount during said quiet state.

24. The telephone as set forth in claim 23 wherein the output signals from the sub-band filters in each bank are each attenuated 6 dB during said quiet state.

25. A method for echo suppression in a telephone having a receive channel and a transmit channel, said method comprising the steps of:
   defining a plurality of call states irrespective of noise;
   defining at least two noise levels;
   defining a matrix of operating conditions according to call state and noise level;
   providing a sub-band filter bank and a non-linear processor coupled in series in at least one channel;

providing at least one adaptive echo canceller coupled between said receive channel and said transmit channel in parallel with a first echo path;

operating the sub-band filter bank, the non-linear processor, and the adaptive echo canceller in varying proportions according to the matrix and in a hierarchical order.

26. The method as set forth in claim 25 wherein said operating step includes the steps of:

first applying the sub-band filters to echo suppression;

then applying the adaptive echo canceller to echo suppression; and, if necessary, then applying non-linear processing to echo suppression.

27. The method as set forth in claim 26 wherein said operating step includes the step of:

preventing the sub-band filter bank, the non-linear processor, and the adaptive echo canceller from simultaneous maximum suppression.

28. The method as set forth in claim 25 wherein said operating step includes the step of:

preventing the the sub-band filter bank, the non-linear processor, and the adaptive echo canceller from simultaneous maximum suppression.

* * * * *